US 6,684,322 B1

(12) United States Patent
Gruner et al.

(10) Patent No.: US 6,684,322 B1
(45) Date of Patent: Jan. 27, 2004

(54) METHOD AND SYSTEM FOR INSTRUCTION LENGTH DECODE

(75) Inventors: Fred Gruner, Palo Alto, CA (US); Mike Morrison, Sunnyvale, CA (US); Kushagra Vaid, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/385,922

(22) Filed: Aug. 30, 1999

(51) Int. Cl.$^7$ .................................................. G06F 9/30
(52) U.S. Cl. ........................................ 712/210; 712/212
(58) Field of Search ................................. 712/210, 212

(56) References Cited

U.S. PATENT DOCUMENTS

| | | | | |
|---|---|---|---|---|
| 5,535,347 A | * | 7/1996 | Grochowski | 712/204 |
| 5,537,629 A | * | 7/1996 | Brown | 712/210 |
| 5,592,635 A | * | 1/1997 | Chan | 712/210 |
| 5,859,994 A | * | 1/1999 | Zaidi | 712/209 |
| 5,983,333 A | * | 11/1999 | Kolagotla et al. | 711/219 |
| 5,987,235 A | * | 11/1999 | Tran | 399/8 |
| 6,237,074 B1 | * | 5/2001 | Phillips | 711/213 |
| 6,308,257 B1 | * | 10/2001 | Theogarajan | 712/210 |

* cited by examiner

*Primary Examiner*—Eric Coleman
(74) *Attorney, Agent, or Firm*—Blakley, Sokoloff, Taylor & Zafman LLP

(57) ABSTRACT

A system and method for decoding the length of a macro instruction is described. In one embodiment, the system comprises an opcode-plus-immediate logic unit to generate a first length value, the first length value comprising a length of an opcode plus a length of intermediate data. A memory-length logic unit generates a second length value, the second length value comprising a potential length of a memory displacement, the opcode-plus-immediate logic unit and memory-length logic unit operating in parallel. In addition, the system comprises a length-summation logic unit to sum the first length value and the second length value if the second length value is present.

23 Claims, 8 Drawing Sheets

METHOD AND SYSTEM FOR INSTRUCTION LENGTH DECODE

FIELD OF THE INVENTION

The present invention pertains generally to the field of computer systems and more particularly to a system and method for decoding the links of macrocode instructions within pipelined or super pipelined microprocessors.

BACKGROUND OF THE INVENTION

Processors (including, but not limited to, general and special purpose microprocessors, micro-controllers, and digital signal processors (DSPs)) typically include execution units that execute a sequence of instructions, termed micro-instructions, derived from a computer program. Many computer programs are written in a high level language that is not directly executable by the central processing unit (CPU) of a computer and the instructions of such programs must accordingly be decoded into a form suitable for execution by the CPU. For example, a program may be written in a high level language such as C, C++, or Java, and then compiled into a corresponding sequence of macro-instructions, which are in turn decoded into micro-instructions for eventual execution. Programs can also be written directly of a series of macro-instructions (that is, machine code).

Macro-instructions are commonly stored as contiguous data blocks in a memory resource, such as main memory (ergo, RAM) or in a cache, for retrieval and supplied to a decoder unit within a processor for decoding into micro-instructions. To enable the decoder unit successfully to decode macro-instructions, it will be appreciated that it is necessary to identify instruction boundaries within retrieve data blocks, that constitute the instruction stream, that indicate where one macro-instruction ends and the next begins.

The task of identifying such instruction boundaries by processors having complex instruction set (CISC) architectures, such as the Intel architecture (IA) developed by Intel Corporation of Santa Clara, Calif., is complicated by the use of a variable-length instruction set (e.g., the Intel architecture (IA) instruction set). Specifically, in reduced instruction set computer (RISC) processor architectures and instruction sets, macro-instructions typically had a fixed length, in which case the boundaries between instructions can be determined with relative ease once an initial boundary is identified, as each instruction has a known length. For a variable-length instruction set, once an initial boundary location is identified, the length of each macro-instruction must be ascertained to identify subsequent instruction boundaries. The task of identifying boundaries is further complicated by a variable-length instruction set that, for the purposes of supporting legacy programs, supports multiple data and addressing sizes.

SUMMARY OF THE INVENTION

A system and method for decoding the length of a macro instruction is described. In one embodiment, the system comprises an opcode-plus-immediate logic unit to generate a first length value, the first length value comprising a length of an opcode plus a length of intermediate data. A memory-length logic unit generates a second length value, the second length value comprising a potential length of a memory displacement, the opcode-plus-immediate logic unit and memory-length logic unit operating in parallel. In addition, the system comprises a length-summation logic unit to sum the first length value and the second length value if the second length value is present.

BRIEF DESCRIPTION OF THE DRAWINGS

The objects, features and advantages of the present invention will be apparent to one skilled in the art in light of the following detailed description in which.

DETAILED DESCRIPTION

A system and method for instruction length decode of macro-instructions are described.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Figure 1:
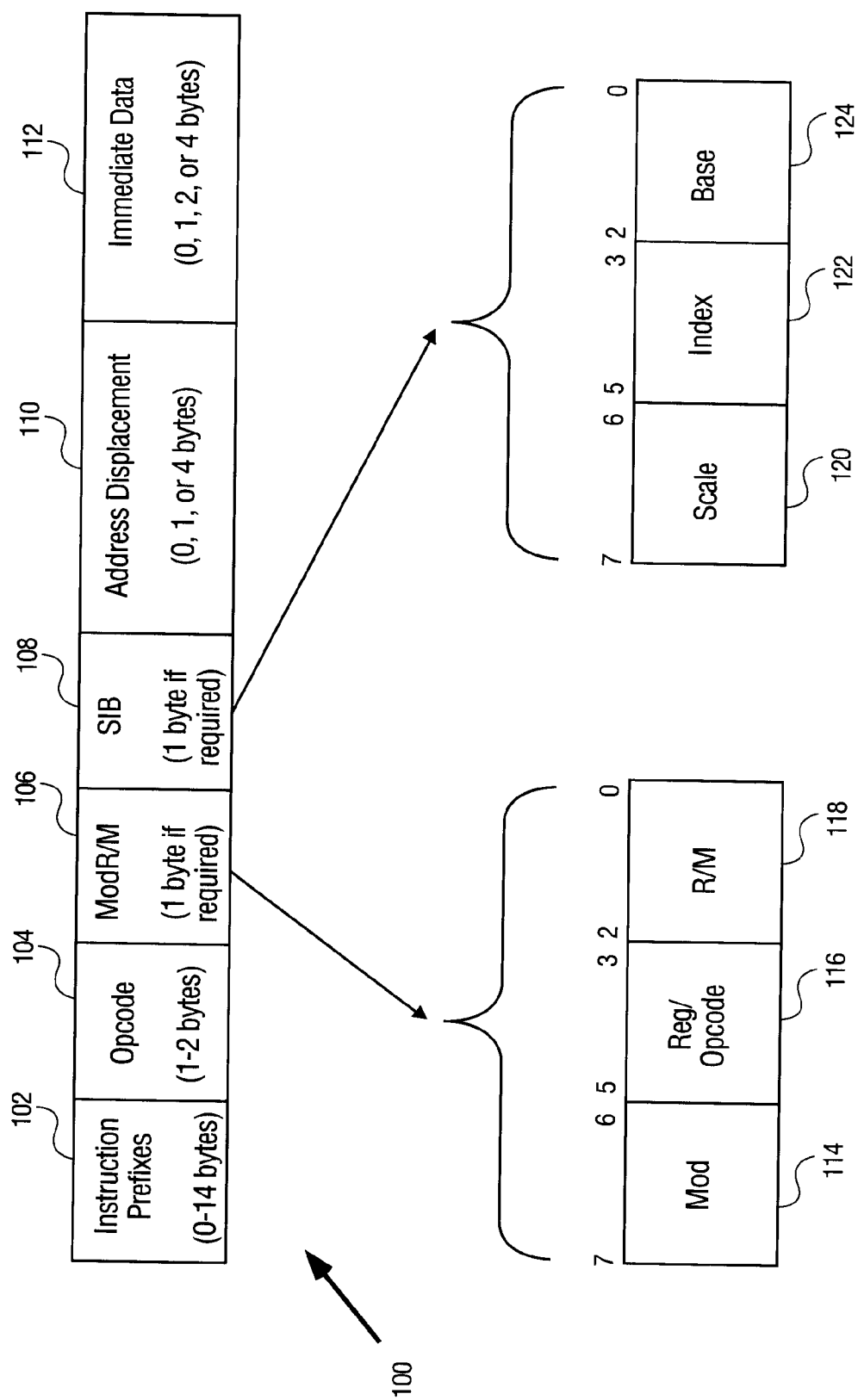
FIG. 1 is a block diagram illustrating an exemplary format of a macro-instruction consisting of bytes that may be decoded according to the present invention.

FIG. 1 is a diagrammatic representation of an exemplary macro-instruction 100 consisting of bytes that may be decoded according to the teachings of the present invention. Specifically, FIG. 1 illustrates the format of an exemplary macro-instruction forming the part of the Intel architecture (IA) instruction set, as developed by Intel Corporation of Santa Clara, Calif. For purposes of the present specification, the terms "macro-instruction" and "instruction" shall both be taken to refer to what is commonly understood to be a macro-instruction and not a micro-instruction.

As defined within the Intel architecture instruction set, an exemplary macro-instruction 100 may comprise zero to fourteen instruction prefixes 102 (each instruction prefix 102 being one byte in length), an opcode 104 (1–2 bytes in length), a ModR/M operand indicator 106 (0–1 byte in length), an SIB of 108 (0–1 lengths in byte), address displacement 110 (0–4 bytes in length), and an intermediate data constant 112 (0–4 bytes in length). Opcode 104 may be either one or two bytes in length. For two-byte opcodes, the first byte is 0F.

ModR/M, if present, is one byte in length and comprises a mod field 114, reg/opcode field 116 and the R/M field 118. The mod field 114 combines with the R/M field 118 to form 32 possible values: 8 register and 24 addressing modes. The reg/opcode field 116 specifies either a register number or three more bits of opcode information. The reg/opcode field 116 use is specified in the first byte of the primary opcode 104. The R/M field 118 may specify a register as operand or may be combined with the mod field 114 to encode an addressing mode. Certain encodings of the ModR/M byte 106 require a second addressing byte, the Scale Index Base (SIB) byte 108, to fully specify the addressing mode of the instruction. The base-plus-index and base-plus-scaled-index forms of 32-bit addressing require the SIB byte 108. SIB byte 108 includes a scale field 120, which specifies the scale factor, index field 122, which specifies the register number of the index register, and base field 124 which specifies the register number of the base register.

Current processors, such as for example the Pentium Pro® or the Pentium II® ( Processors, may operate in either a 16- or 32-bit mode. Each macro-instruction may be decoded and executed as:

1. A fixed 8-bit data/address instruction;
2. A fixed 16-bit data/address instruction; or
3. A variable 16- or 32-bit data/address instruction, as determined by a mode operation bit (commonly termed a D-bit) within the IA processor.

Figure 2:
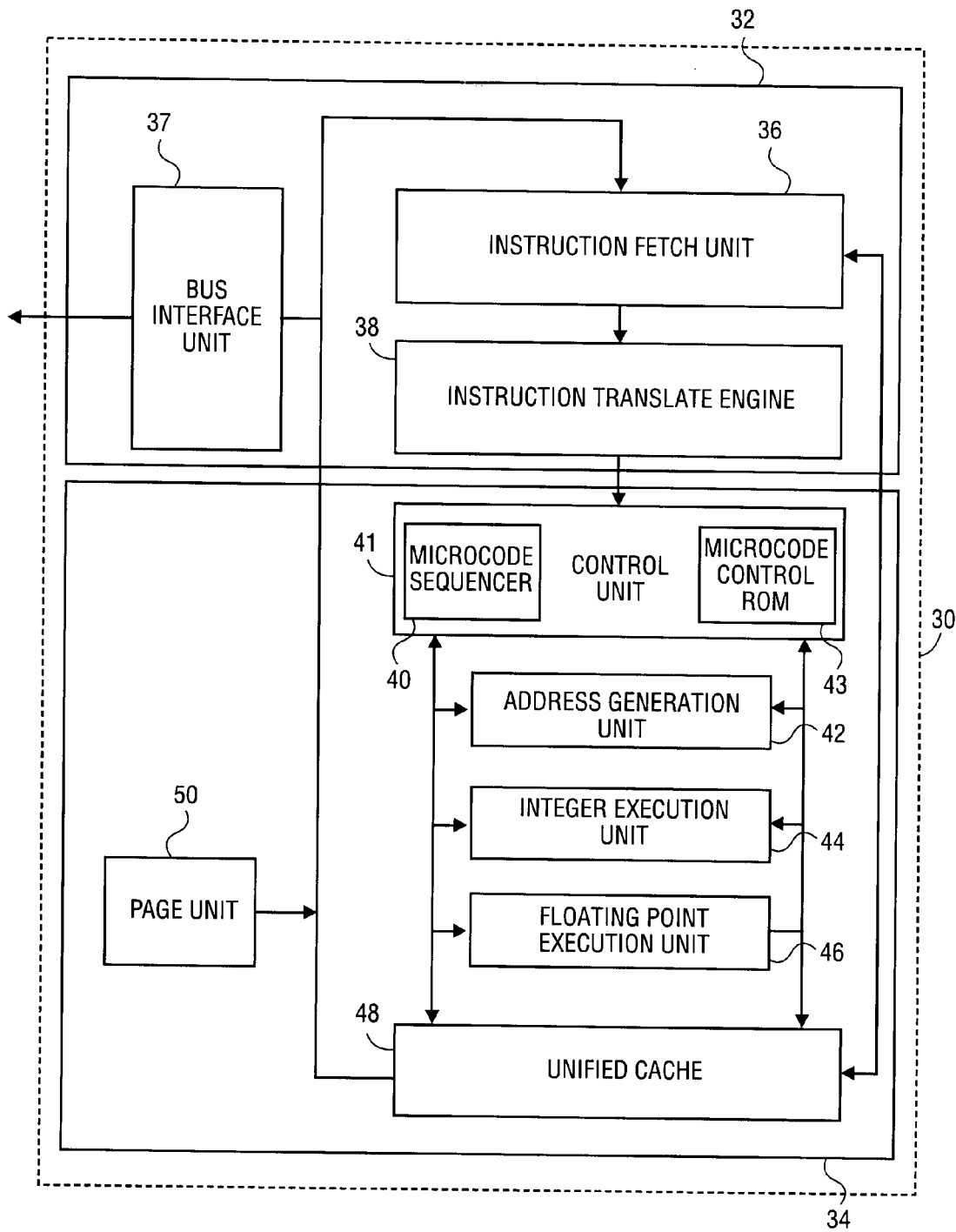
FIG. 2 is a block diagram showing an architecture of an exemplary microprocessor within which the present invention may be implemented.

FIG. 2 is a block diagram showing an exemplary microprocessor 30 within which the present invention may be implemented. The microprocessor 30 is pipelined and includes in-order front-end circuitry 32 and out-of-order back-end circuitry 34. The out-of-order back-end circuitry 34 executes micro-instructions in an out-of-order fashion and retires executed micro-instructions in an in-order fashion according to the original sequence in the macro instruction. The front-end circuitry 32 comprises an instruction fetch engine 36 that retrieves macro-instructions, which may conform to the format illustrated in FIG. 1, via a bus interface unit 37 from a main memory (not shown) associated with a microprocessor 30, or from an internal unified cache 48 that caches both macro-instructions and data. In an alternative embodiment, cache 48 may be located downstream of an instruction translate engine 38 and may cache decoded micro-instructions derived from macroinstructions. Macro-instructions retrieved by the instruction fetch engine 36 are then propagated to the instruction translate engine 38 that translates macro-instructions into corresponding micro-instructions. Micro-instructions are issued from the instruction translate engine 38 to a control unit 40 (also referred to as a microcode unit), that forms part of the back-end circuitry 34, and includes a microcode sequencer (MS) 41 and a microcode control read-only memory (ROM) 43. The control unit 40 interprets the micro-instructions sent to it, and handles exceptions, break points, and interrupts. From the control unit 40, micro-instructions are dispatched to a pipeline including an address generation unit 42, an integer execution unit 44 (also known as an arithmatic/logic unit (ALU)) and/or a floating point execution unit 46.

The microprocessor 30 further includes a page unit 50 that translates linear addresses into physical addresses, and includes at least one translation look-aside buffer (TLB) for this purpose.

Figure 3:
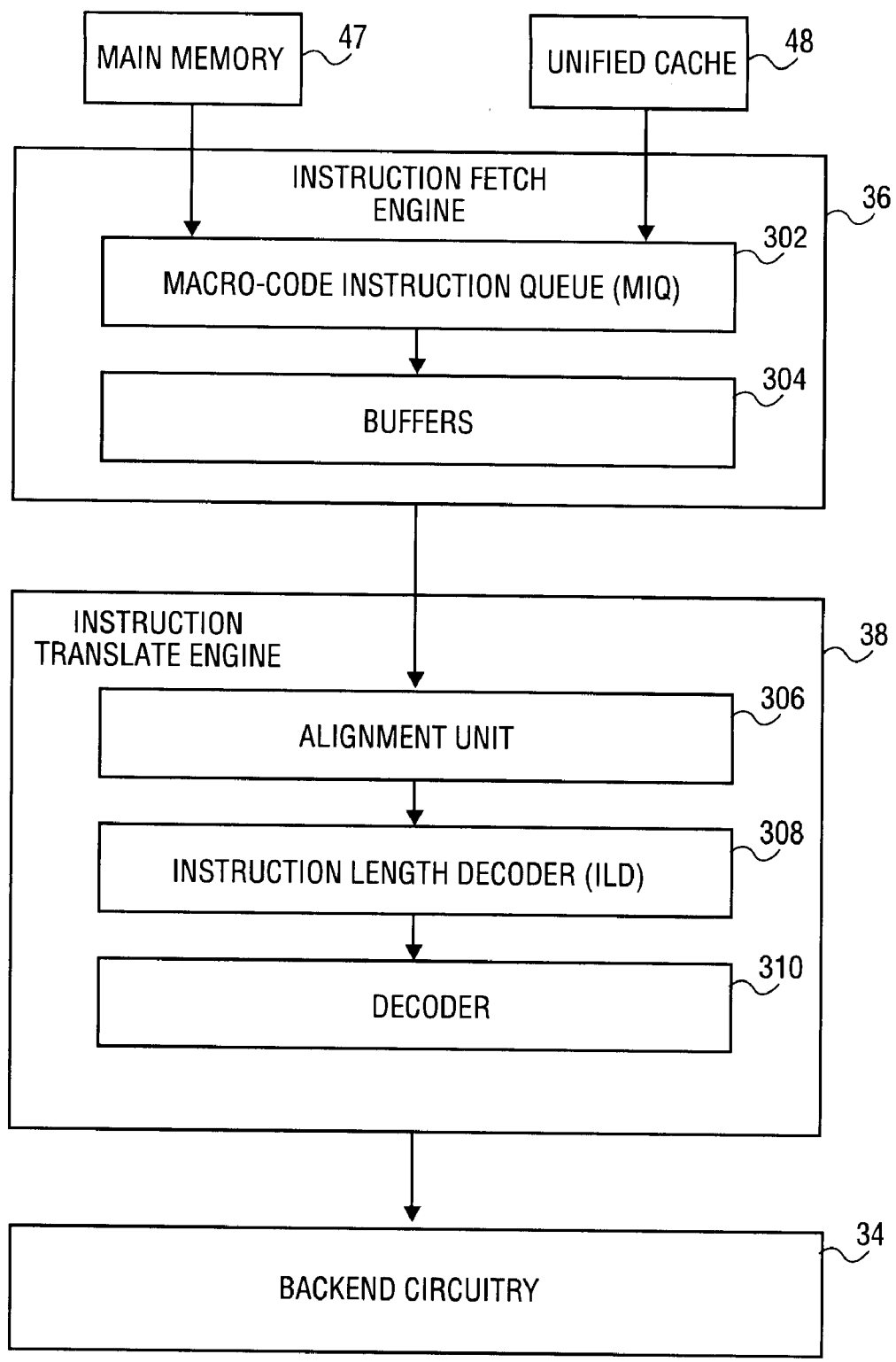
FIG. 3 is a block diagram showing architectural details regarding an instruction fetch engine and an instruction translate engine, according to exemplary embodiment of the present invention, that may be incorporated into the microprocessor shown in FIG. 2.

FIG. 3 is a block diagram showing further details regarding the instruction fetch engine 36 and the instruction translate engine 38 of the exemplary microprocessor shown in FIG. 2. The instruction fetch engine 36 is shown to include a macrocode instruction queue (MIQ) 302 for receiving macro-instructions from main memory 47 or unified cache 48. Alignment buffers 304 buffer macro instructions before they are dispatched to the instruction translate engine 38.

The alignment unit (ALN) 306 is responsible for aligning the instruction stream. ALN 306 determines where a fetch set of data the instruction to be executed begins and ends. A pointer within alignment buffers 304 is adjusted to point to the next instruction to be executed in the processor. Using the length of the previous instruction and the known starting point of the previous instruction, ALN 306 shifts the data stream pointer in order to align the pointer to the beginning of the next instruction in the data stream. ALN 306 aligns the instruction one pipe stage behind the length decode of the instruction. The present invention decodes one instruction per cycle within two pipe stages.

In the second pipe stage, instruction length decoder (ILD) 308 determines the length of the current instruction. IA instructions are variable length instructions varying in length from 1 to 15 bytes with prefixes or from 1 to 11 bytes without prefixes. In order to properly align and decode the instructions, the length of the instruction must be determined. The bytes that are received from the ALN 306 stage are assumed to start with the first byte of instruction. The ILD 308 decodes these instruction bytes, determines the length of the instruction, and sends the length to the ALN 306 for subsequent instruction realignment and to the DE1 stage for marking the instruction boundaries.

ILD 308 decodes instruction lengths in one pipe stage. All instruction lengths are computed in the same clock cycle. Instructions with prefixes take up to N+1 clock cycles, where N is the number of prefixes preceding the instruction. In one embodiment, the parallel computation of the instruction data is used to determine the lengths of individual components and then these components are merged together to determine the total resulting length. Decoding length information in one cycle and using this length information for alignment in the same cycle allows the present invention to reduce overhead performance loss. In addition, in one embodiment, less chip area may be utilized in order to implement the present invention.

ILD 308 creates an output length vector, which is utilized in decoder 310 for the decoding of the instruction. In one embodiment, a two-stage alignment-decode mechanism for the alignment (ALN) and length (LEN) or decode stages is used. ALN 306 includes one or more buffers for holding fetched information, and for communication with the fetch engine 36 for fetching instructions from memory or cache. ALN 306 precedes ILD 308 where instructions are initially decoded. ALN 306 fetches one or more instructions from memory or cache and determines where the next instruction begins and ends. Instruction data is fetched from the cache and stored in the buffer, or in one of the plurality of buffers. ILD 308 determines the length of the instruction in order to align the next instruction within the buffer.

Figure 4:
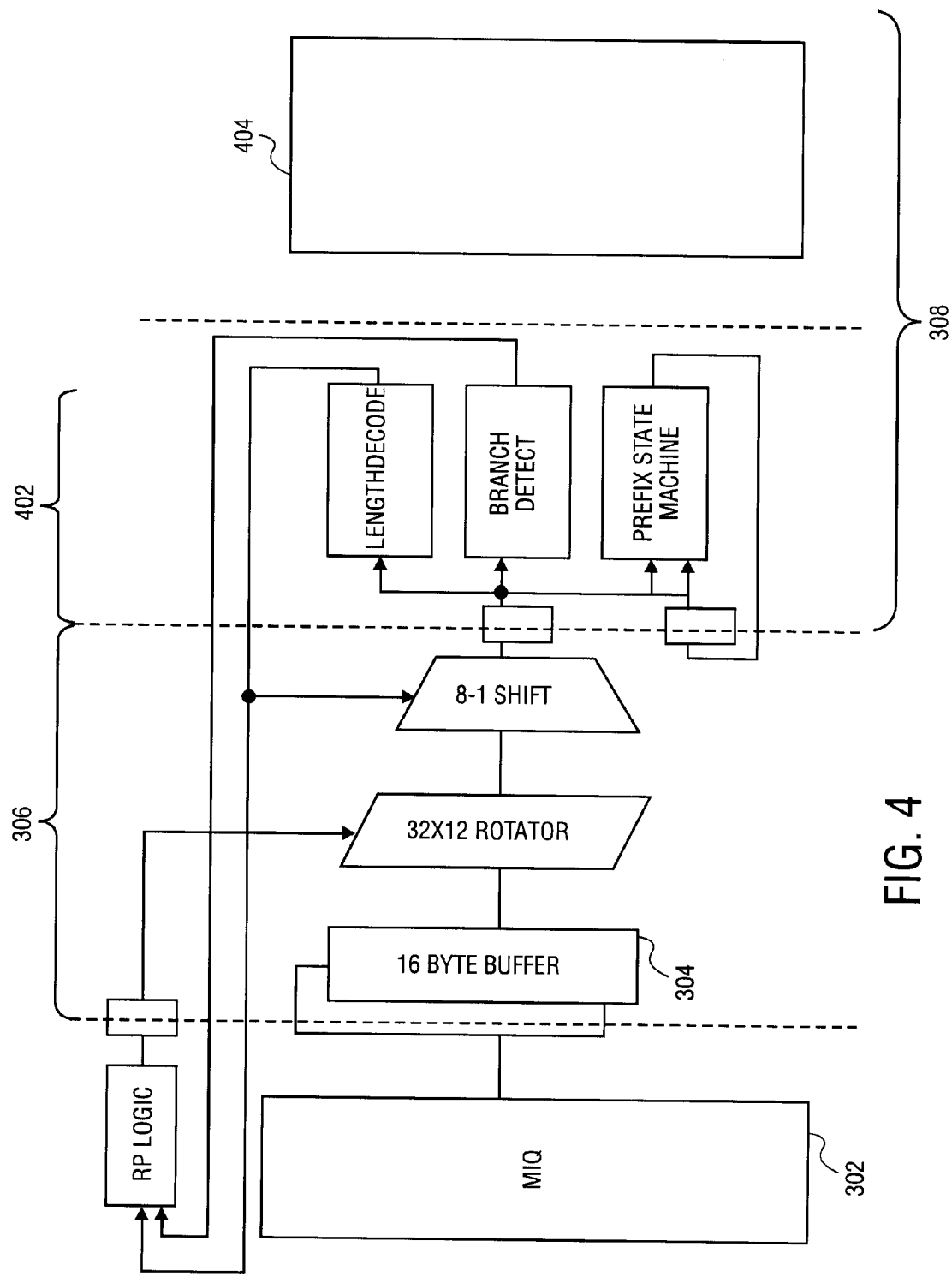
FIG. 4 is block diagram showing architectural details of one embodiment of an instruction length decoder (ILD) within the instruction pipe.

FIG. 4 is a block diagram showing architectural details of one embodiment of an instruction length ALN 306 and ILD 308 with the instruction pipe. Length Decode (LEN) 402 is housed within the ILD 308. In addition, ILD 308 contains back-end circuitry 404 for processing the decoded instructions. LEN 402 receives the instruction data from ALN 306 and determines the length of the instruction. The instruction length is used by the ALN 306 to shift the next instruction. In addition, LEN 402 calculates the prefix count and shifts the instruction lengths by the prefix count. If the length of the instruction exceeds 15 bytes, LEN 402 flags a length violation. The decoded instructions are passed to back-end circuitry 404 for processing.

LEN 402 is also responsible for decoding prefixes. Prefix State Machine looks at instruction byte 0 to determine if a prefix was encountered and to determine the prefix type. Prefix State Machine also counts prefixes it has encountered for a particular instruction.

Figure 5:
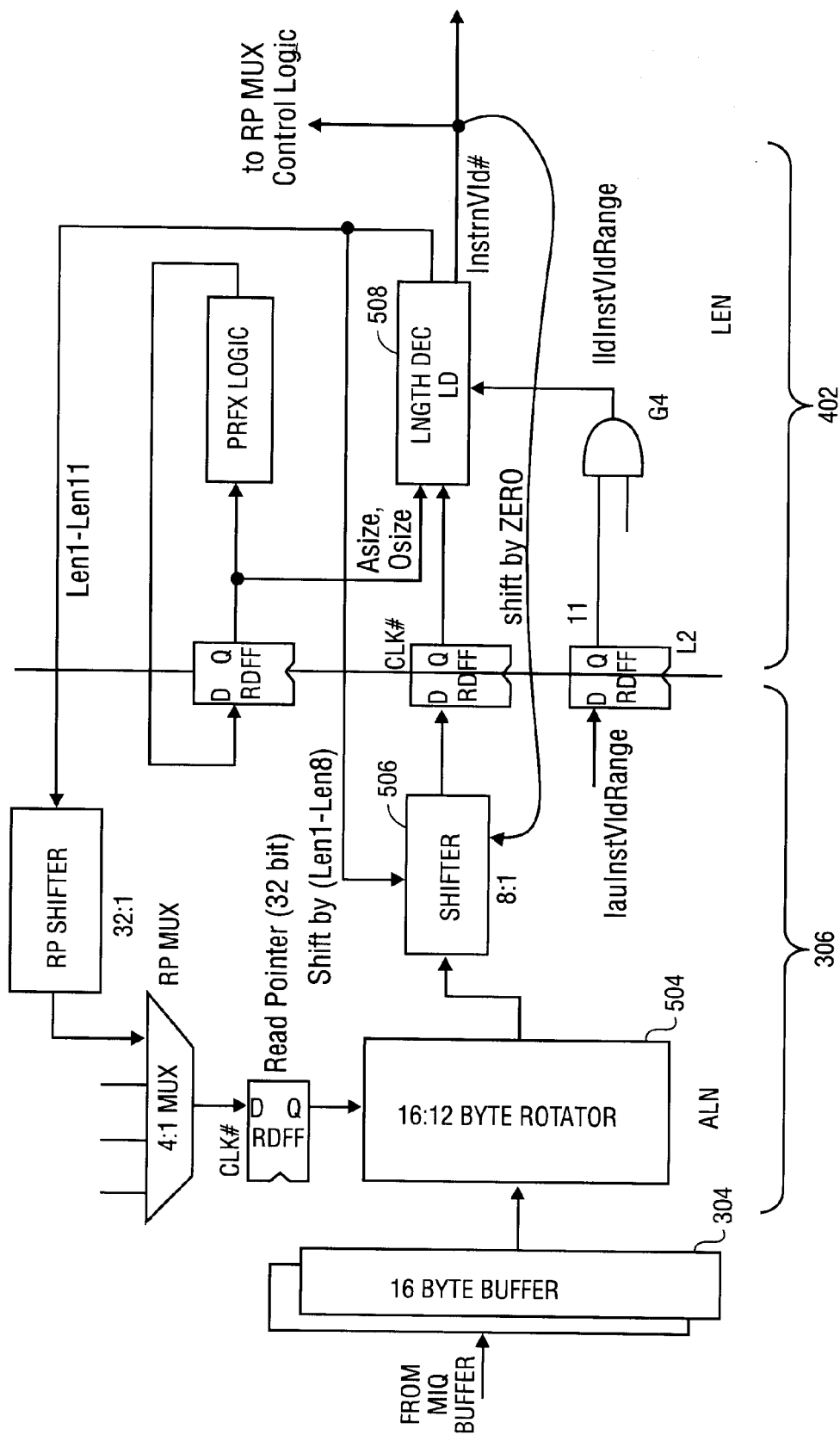
FIG. 5 is a block diagram showing architectural details of a portion of the ILD.

FIG. 5 is a block diagram showing architecture details of ALN 306 and LEN 402. Data stream bytes are received into two 10×16-byte buffers 306 from MIQ buffers 302. The data stream is rotated into rotator 504. In one embodiment, rotator 504 consists of 12 bytes. Rotator 504 rotates the data bytes of two instructions. In one embodiment, an instruction has a maximum length of 11 bytes (without prefixes). If 12 bytes captures both instructions, then ALN 306 will have a maximum throughput. Rotator 504 is one pipe stage behind the decoding of the current instruction. Using the length vector obtained from the LEN 402, ALN 306 next shifts the current instruction into shifter 506. Shifter 506 shifts to the exact instruction start based on the length of the first instruction in the data stream. If rotator 504 does not contain the entire instruction required by shifter 506, rotator 504 rotates instruction data from buffers 304. Shifter 506 output gives the current instruction for the current pipe stage. It is assumed that the first instruction within the data stream begins at the beginning of the data buffer. Thus, during the current pipe stage, rotator 504 is obtaining instruction data for the current instruction while shifter 506 is obtaining data for the next instruction in the data stream.

Referring to Table 1, an example of the alignment of one embodiment is shown. Table 1 shows the contents of buffers 304. In this example, it is assumed that instruction A is being executed and has a length of 5 bytes. This example assumes that no branches are present in the current buffer.

TABLE 1

|  | Buffer 1 |
| --- | --- |
| Byte 1 |  |
| Byte 2 | A |
| Byte 3 |  |
| Byte 4 |  |
| Byte 5 |  |
| Byte 6 |  |
| Byte 7 | B |
| Byte 8 |  |
| Byte 9 |  |
| Byte 10 | C |
| Byte 11 |  |
| Byte 12 |  |

Initially, rotator 504 contains bytes 2–13 as shown in Table 2 for time 1. The shifter 506 contains bytes 2–13 and length is 0. LEN 402 determines the length of A. The length of A is returned to shifter 506. At time 2, shifter 506, using the length of A of 5 bytes, shifts bytes from rotator 504 into shifter 506 offset by the length of A and shifts A to LEN 402. Thus, rotator 504 contains bytes 2–13, the shifter 506 now contains bytes 7–13, and LEN 402 contains bytes 2–6 (instruction A). Shifter 506 then shifts bytes 7–13 to LEN 402 for length determination of instruction B. At time 3, shifter 506, using the length of B of 3 bytes, shifts instruction B into LEN 402, bytes 10–18 are shifted into shifter 506, and rotator contains bytes 7–18. The process is repeated in order to shift instruction C into LEN 402 as shown in Table 2.

TABLE 2

| Time | 1 | 2 | 3 | 4 |
| --- | --- | --- | --- | --- |
| ALN Rotator Output (Buffer Bytes) | 2–13 | 2–13 | 7–18 | 10–21 |
| ALN Shifter Output (Buffer Bytes) | 2–13 | 7–13 | 10–18 | 12–21 |
| Length in LEN | 0 | 5 | 3 | 2 |
| Instruction in LEN |  | A | B | C |

Instruction prefixes 102 are handled as length 1 instructions. This enables the LEN 308 to decode the prefixes one prefix at a time. When the two instruction buffers 304 do not represent consecutive addresses (that is, a branch is predicted to be taken), a clock cycle is used to clean-up and reset the read pointer to the target of the branch.

Figure 6A:
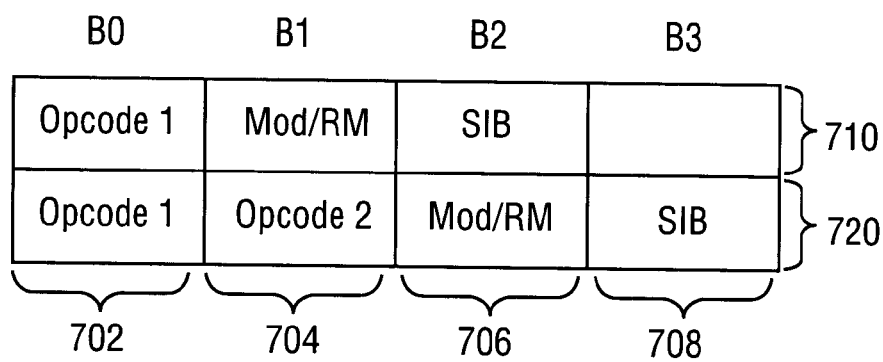
FIG. 6a is a block diagram of one embodiment of a portion of the macro-instruction shown in FIG. 1 consisting of bytes 0–3 that may be decoded according to the present invention.

Referring to FIG. 6a, the first four bytes of a macro-instruction are shown in two configurations. Configuration 1 (710) shows a one-byte opcode 104, the ModR/M byte 106, and the SIB byte 108. The opcode 104 is in byte 0 (702), the ModR/M byte 106 is in byte B1 (704), and the SIB byte 108 is in byte B2 (706). The second configuration 720 shows a two-byte opcode 104 configuration. In this configuration, the opcode 104 occupies bytes B0 (702) and B1 (704), the ModR/M byte 106 occupies byte B2 (706), and the SIB byte 108 occupies byte B3 (708).

Figure 7:
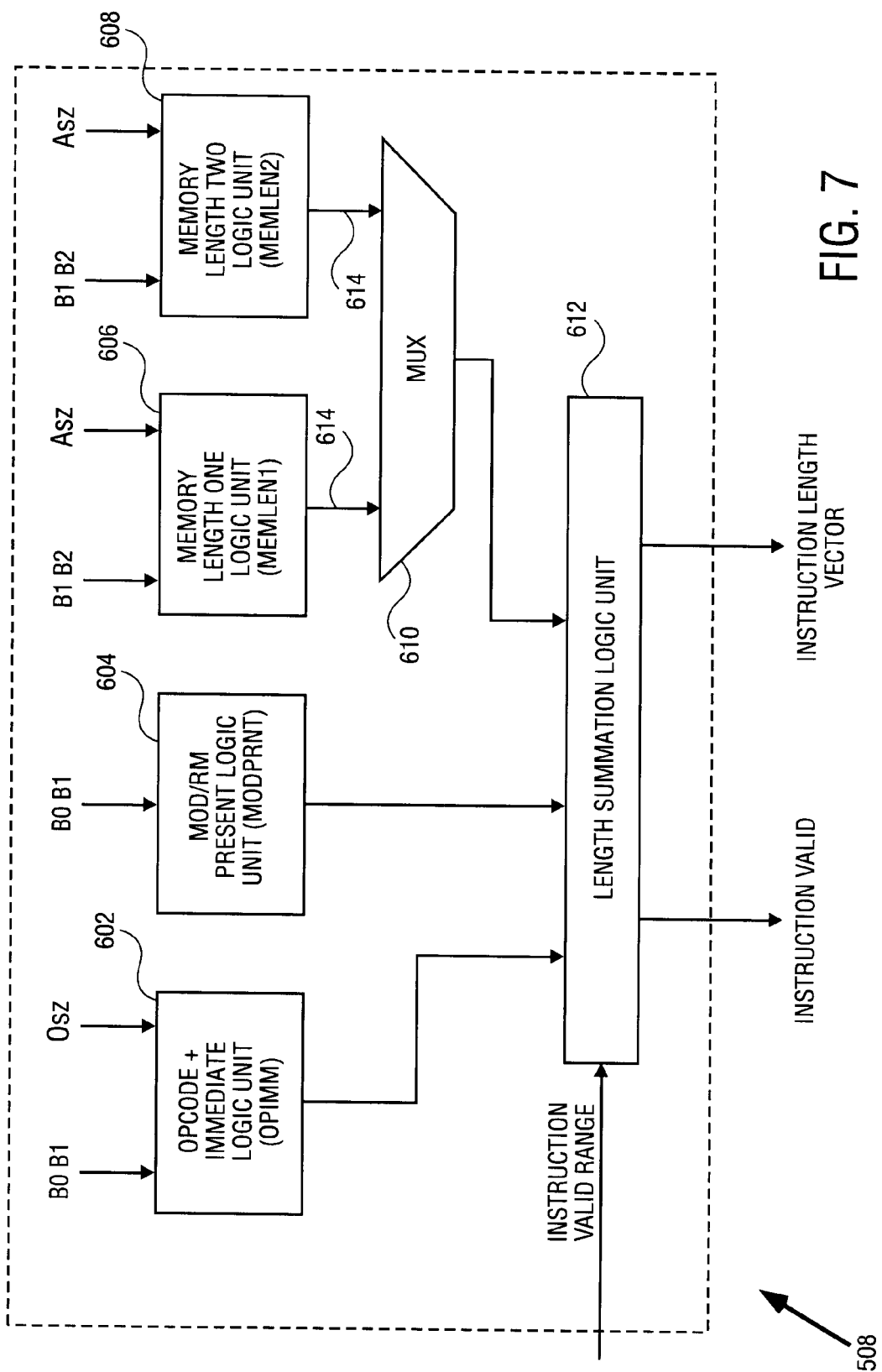
FIG. 7 is a block diagram showing architectural details of one embodiment for the length decode unit.

FIG. 7 is a block diagram showing architectural details of one embodiment of the instruction length decoder (LD) 508. LD 508 determines the length of various portions of the instruction received from ALN 306. ALN 306 shifts the current instruction from the shifter 506 onto the LD 508. Within the LD 508, opcode-plus-immediate logic unit 602 determines the length of the opcode 104 and immediate data 112 of the current instruction. B0 and B1 are inputs to OPIMM 602 together with the operand-size (Osz) signal. The Osz signal selects the sizes of operands that instructions operate on. When the 16-bit Osz signal is in force, operands may be either 8 or 16 bits. When the 32-bit Osz signal is in force, operands may be 8 or 32 bits.

Simultaneously, a ModR/M present logic unit (MODBRNT) 604 determines if the ModR/M 106 is required. B0 and B1 are input into the MODPRNT 604 logical unit. The MODPRNT 604 logical unit performs a lookup of the opcode to determine whether a ModR/M byte is required.

LD 508 also determines memory address displacement length 614 for address displacement 110. LD 508 assumes that the ModR/M byte 106 is present and determines memory address displacement length 614 for both the one-byte and two-byte opcodes. A memory-length-one logic unit (MEMLEN1) 606 determines an anticipatory length of the memory displacement based on an assumption that a one-byte opcode 104 is present. MEMLEN1 606 uses the input from bytes B1 and B2. This corresponds to configuration 710 of FIG. 6a. In addition, an address-size (Asz) signal is provided to MEMLEN1 606. The Asz signal selects the sizes of addresses used to address memory, either 16 or 32 bits. When the 16-bit Asz signal is in force, segment offsets and displacements are 16-bits. This limits the size of a segment that may be addressed to 64 KiloBytes. When the 32-bit Asz signal is in force, segment offsets and displacements are 32-bits, allowing segments up to 4 GigaBytes to be addressed.

A memory-length-two logic unit (MEMLEN2) 608 determines an anticipatory length of the memory based on an assumption that a two-byte opcode 104 is present. The MEMLEN2 608 uses the input from B2 and B3, corresponding to the second configuration 720 of FIG. 6a, together with Asz. The output from MEMLEN1 606 and MEMLEN2 608 are multiplexed by multiplexer (MUX) 610, and a MEMLEN is output depending upon whether a one-byte or two-byte opcode is present.

The outputs from OPIMM 602, MODBRNT 604, and from MUX 610 are combined together by a length-summation logic unit 612. Length-summation logic unit 612 adds the lengths based on whether the ModR/M byte 106 is required by the opcode 104. Length-summation logic unit 612 creates two outputs: an instruction valid signal and an instruction length vector.

Using an instruction valid range input, length-summation logic unit 612 determines if the instruction is a valid instruction by combining the instruction valid range and the instruction length. In one embodiment, an instruction may be from 1 to 11 bytes in length (without prefixes).

Figure 6B:
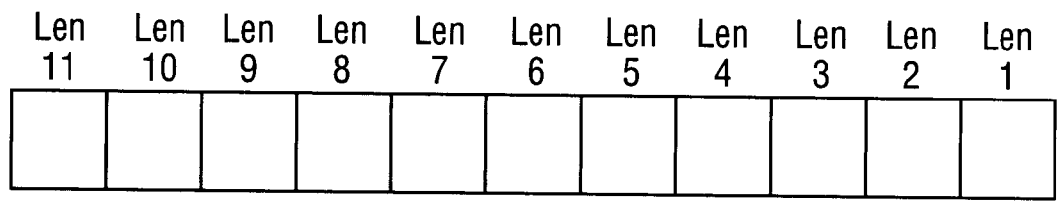
FIG. 6b is a block diagram of one embodiment of an instruction length vector.

The instruction length vector is an 11-byte vector as shown in FIG. 6b. The instruction length vector is set to all zeroes except for the byte that indicates the length of the instruction, which is set to 1 for the length. Thus, if the instruction is 11 bytes in length, Len 11 is set to 1 and all other bits are set to 0. If the instruction is invalid, the instruction length vector is set to all zeroes. If the instruction is invalid, the shifter 506 does not shift the next instruction into the length decode and a clock cycle is required to realign the instructions.

Table 3 shows the possible outputs from OPIMM 602. The outputs are dependent on whether the opcode 104 is one or two bytes and the possible lengths of the immediate data 112. The immediate data may be 1, 2, 4 or 6 bytes in length. Thus, the opcode plus immediate may be 1, 2, 3, 4, 5, 6 or 7 bytes in length. Table 3 indicates the possible combinations of opcode and immediate displacement.

TABLE 3

| OPCODE BYTE 1 | OPCODE BYTE 2 | 1 BYTE IMM | 2 BYTE IMM | 4 BYTE IMM | 6 BYTE IMM | OPCODE + IMM LENGTH |
|---|---|---|---|---|---|---|
| X | — | — | — | — | — | 1 |
| X | X | — | — | — | — | 2 |
| X | — | X | — | — | — | 2 |
| X | X | X | — | — | — | 3 |
| X | — | — | X | — | — | 3 |
| X | — | X | X | — | — | 4 |
| X | X | — | X | — | — | 4 |
| X | — | — | — | X | — | 5 |
| X | X | — | — | X | — | 6 |
| X | — | — | — | — | X | 7 |

Table 4 indicates the possible outputs from MUX 610. Depending on whether a ModR/M or SIB byte are present and the valid, possible displacements, the displacement length is determined. The possible memory displacements are 1, 2 or 4 bytes. The possible memory displacements may be 1, 2, 3, 5 or 6 bytes in length. With the valid, possible combinations, it is not possible to have a memory displacement of four bytes in length.

TABLE 4

| ModR/M PRESENT | SIB PRESENT | 1 BYTE DISP | 2 BYTE DISP | 4 BYTE DISP | DISP LENGTH |
|---|---|---|---|---|---|
| Y | N | — | — | — | 1 |
| Y | Y | — | — | — | 2 |
| Y | N | X | — | — | 2 |
| Y | Y | X | — | — | 3 |
| Y | N | — | X | — | 3 |
| — | — | — | — | — | 4 NOT POSSIBLE |
| Y | N | — | — | X | 5 |
| Y | Y | — | — | X | 6 |

Table 5 shows the possible outputs for the instruction length vector of length summation logic unit 612. The table shows the combinations of the outputs from the OPIMM 602, MODPRNT 604, and MUX 610. Total instruction length may be from 1 to 11 bytes as indicated in Table 5.

TABLE 5

| MEMLEN | OPIMM7 | OPIMM6 | OPIMM5 | OPIMM4 | OPIMM3 | OPIMM2 | OPIMM1 | LENGTH |
|---|---|---|---|---|---|---|---|---|
| 6 | — | — | YES | — | — | — | — | 11 |
| 6 | — | — | — | NO | — | — | — | 10 |
| 6 | — | — | — | — | YES | — | — | 9 |
| 6 | — | — | — | — | — | YES | — | 8 |
| 6 | — | — | — | — | — | — | YES | 7 |
| 5 | — | NO | — | — | — | — | — | 11 |
| 5 | — | — | YES | — | — | — | — | 10 |
| 5 | — | — | — | NO | — | — | — | 9 |
| 5 | — | — | — | — | YES | — | — | 8 |
| 5 | — | — | — | — | — | YES | — | 7 |
| 5 | — | — | — | — | — | — | YES | 6 |
| 4 | Not Applicable | Not Applicable | Not Applicable | Not Applicable | Not Applicable | Not Applicable | Not Applicable | — |
| 3 | NO | — | — | — | — | — | — | 10 |
| 3 | — | NO | — | — | — | — | — | 9 |
| 3 | — | — | YES | — | — | — | — | 8 |
| 3 | — | — | — | NO | — | — | — | 7 |
| 3 | — | — | — | — | YES | — | — | 6 |
| 3 | — | — | — | — | — | YES | — | 5 |
| 3 | — | — | — | — | — | — | YES | 4 |
| 2 | NO | — | — | — | — | — | — | 9 |
| 2 | — | NO | — | — | — | — | — | 8 |
| 2 | — | — | YES | — | — | — | — | 7 |
| 2 | — | — | — | NO | — | — | — | 6 |

TABLE 5-continued

| MEMLEN | OPIMM7 | OPIMM6 | OPIMM5 | OPIMM4 | OPIMM3 | OPIMM2 | OPIMM1 | LENGTH |
|---|---|---|---|---|---|---|---|---|
| 2 | — | — | — | — | YES | — | — | 5 |
| 2 | — | — | — | — | — | YES | — | 4 |
| 2 | — | — | — | — | — | — | YES | 3 |
| 1 | NO | — | — | — | — | — | — | 8 |
| 1 | — | NO | — | — | — | — | — | 7 |
| 1 | — | — | YES | — | — | — | — | 6 |
| 1 | — | — | — | NO | — | — | — | 5 |
| 1 | — | — | — | — | YES | — | — | 4 |
| 1 | — | — | — | — | — | YES | — | 3 |
| 1 | — | — | — | — | — | — | YES | 2 |
| NO ModR/M | YES | — | — | — | — | — | — | 7 |
| NO ModR/M | — | YES | — | — | — | — | — | 6 |
| NO ModR/M | — | — | YES | — | — | — | — | 5 |
| NO ModR/M | — | — | — | YES | — | — | — | 4 |
| NO ModR/M | — | — | — | — | YES | — | — | 3 |
| NO ModR/M | — | — | — | — | — | YES | — | 2 |
| NO ModR/M | — | — | — | — | — | — | YES | 1 |

Figure 8:
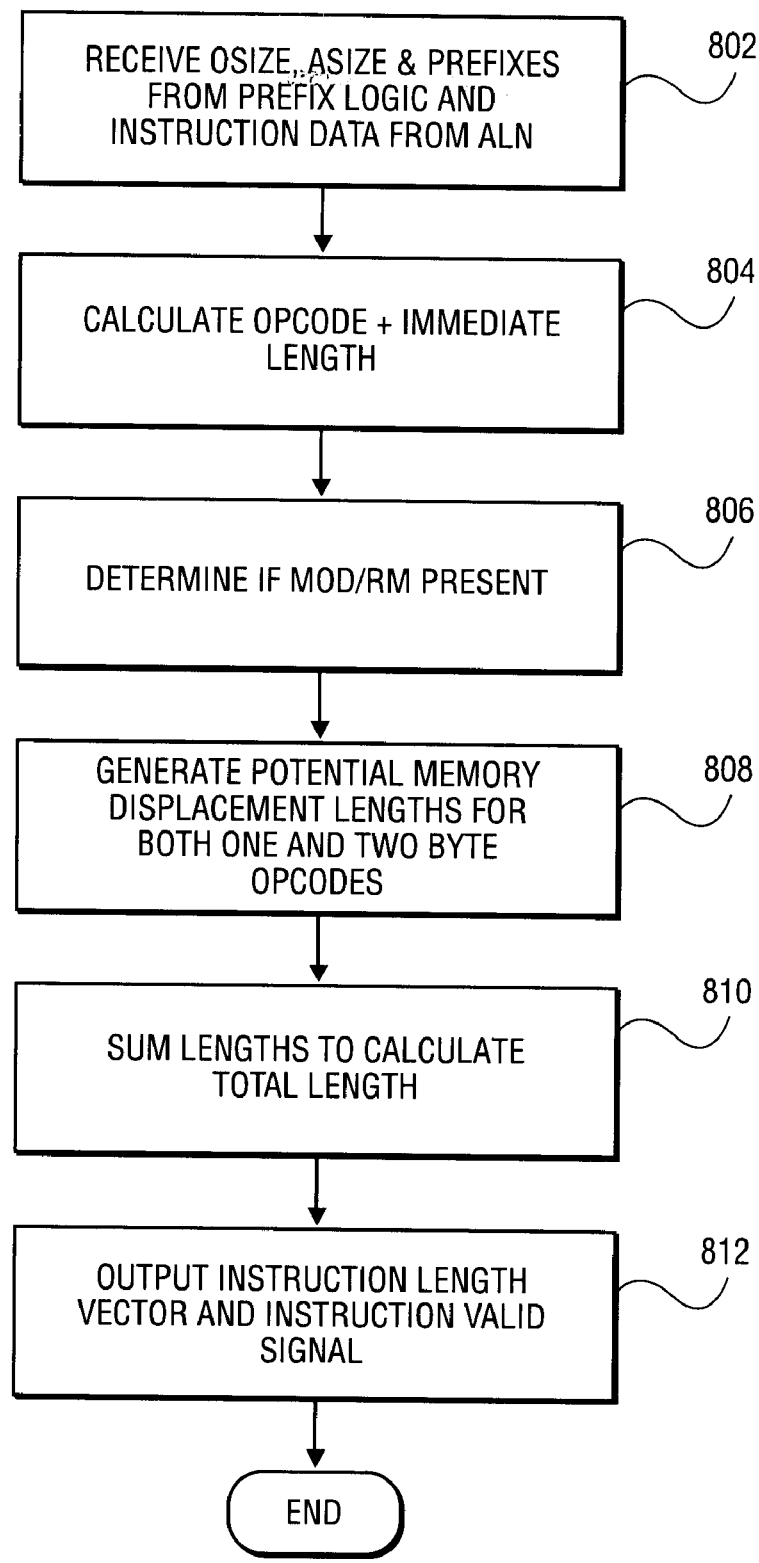
FIG. 8 is a flow diagram illustrating one embodiment of the instruction length decode process.

FIG. 8 is a flow diagram illustrating one embodiment of the instruction length decode process. At block 802, LD 508 receives Osz and Asz signals, prefix signals from the prefix logic unit, and instruction data from ALN 306. At block 804, LD 508 determines the opcode-plus-immediate displacement length.

At block 806, LD 508 determines if the ModR/M byte is required. LD 508 performs a table lookup of the opcode to determine if the opcode requires the ModR/M byte. Block 806 is performed in parallel with block 804.

At block 808, the LD 508 generates a potential memory displacement length for both a one- and two-byte opcode. Block 808 is performed in parallel with blocks 804 and 806. LD 508 determines whether to use the one or two byte opcode length determined in block 808. At block 810, LD 508 sums the outputs from blocks 804, 806, and 808 to determine the total length of the instruction. At block 812, LD 508 outputs an instruction length vector and instruction valid signal. The instruction length vector is shown in FIG. 6b. Depending on the length of the instruction, the LD 508 sets one of the 11 bytes of the instruction to 1 and the rest to zeros. If the instruction is invalid, all bytes in the instruction length vector are set to zero.

Several variations in the implementation for a system and method for instruction length decode of macro-instructions have been described.

The specific arrangements and methods herein are merely illustrative of the principles of this invention. Numerous modifications in form and detail may be made by those skilled in the art without departing from the true spirit and scope of the invention.

What is claimed is:

1. A method for decoding the length of a macro instruction comprising:
   generating a first length value comprising a length of an opcode plus a length of intermediate data;
   generating a second length value comprising a potential length of a memory displacement, the generating of the second length value occurring in parallel with the generating of the first length value; and
   summing the first length value and the second length value if the second length value is present.

2. The method of claim 1 wherein an instruction prefix is decoded as a one-byte instruction.

3. The method of claim 1 further comprising:
   determining if an instruction modifier is present, wherein the determining is performed in parallel with the generating of the first length value and the generating of the second length value.

4. The method of claim 3 wherein the summing further comprises:
   if the instruction modifier is present, combining the second length value with the first length value to decode the length of the instruction; and
   if the instruction modifier is not present, using the first length value to decode the length of the instruction.

5. The method of claim 1 wherein the generating of the first length value further comprises:
   determining the length of the opcode;
   determining the length of immediate data in accordance with the opcode; and
   combining the length of the opcode and the length of the immediate data to generate the first length value.

6. The method of claim 1 wherein the generating of the second length value comprises:
   generating the first anticipatory length value based upon the assumption that the opcode is one byte in length and based upon an assumption that an instruction modifier is present;
   generating the second anticipatory length value, in parallel with the generation of the first anticipatory length value, based upon the assumption that the opcode is two bytes in length and based upon an assumption that the instruction modifier is present; and
   determining the second length value, wherein the determination comprises selecting between the first anticipatory length value and the second anticipatory length value.

7. The method of claim 6 wherein the generating of the first anticipatory length value further comprises:
   determining a length of the instruction modifier;
   determining an instruction displacement length in accordance with the instruction modifier; and combining the length of the instruction modifier and the instruction displacement length to generate the first anticipatory length value.

8. The method of claim 6 wherein the generating of the second anticipatory length value further comprises:

determining a length of the instruction modifier;

determining an instruction displacement length in accordance with the instruction modifier; and combining the length of the instruction modifier and the instruction displacement length to generate the second anticipatory length value.

9. The method of claim 1 wherein the generating of the second length value comprises:

generating the first anticipatory length value based upon the assumption that the opcode is one-byte in length and based upon an assumption that an instruction modifier is present, the generating of the first anticipatory value further comprising, determining a length of the instruction modifier, determining an instruction displacement length in accordance with the instruction modifier, and combining the length of the instruction modifier and the displacement length to generate the first anticipatory length value;

generating the second anticipatory length value, in parallel with generating the first anticipatory length value, based upon the assumption that the opcode is two-bytes in length and based upon the assumption that the instruction modifier is present, the generation of the second anticipatory length value further comprising, determining a length of the instruction modifier, determining an instruction displacement length in accordance with the instruction modifier, and combining the length of the instruction modifier and the displacement length to generate the second anticipatory length value; and determining the second length value, wherein the determination comprises selecting between the first anticipatory length value and the second anticipatory length value.

10. The method of claim 1, further comprising:

generating a first anticipatory length value for the memory displacement based upon an assumption that the opcode is one byte in length; and generating a second anticipatory length value for the memory displacement based upon an assumption that the opcode is greater than one byte in length, wherein the first anticipatory value, the second anticipatory value, and the first length value are generated at the same time.

11. Logic for decoding a length of a macro instruction comprising:

an opcode-plus-immediate logic unit to generate a first length value comprising a length of an opcode plus a length of intermediate data;

a memory-length logic unit to generate a second length value a potential length of a memory displacement, the memory logic unit to generate two or more potential lengths of memory displacement in parallel, the memory-length logic unit and the opcode-plus-immediate logic unit to operate in parallel; and a length-summation logic unit to sum the first length value and the second length value if the second length value is present.

12. The logic of claim 11 further comprising:

a modification-bit-present logic unit to determine if an instruction modifier is present, wherein the modification-bit-present logic unit operates in parallel with the opcode-plus-immediate logic unit and the memory-length logic unit.

13. The logic of claim 12 wherein an instruction prefix is decoded as a one-byte instruction.

14. The logic of claim 11 wherein the opcode-plus-immediate logic unit is further to determine the length of the opcode; to determine the immediate data length in accordance with the opcode; and to combine the length of the opcode and the length of the immediate data to generate the first length value.

15. The logic of claim 11 wherein the memory-length logic unit further comprises:

a memory-length-one logic unit to generate a first anticipatory length value based upon an assumption that the opcode is one byte in length and based upon an assumption that an instruction modifier is present;

a memory-length-two logic unit to generate a second anticipatory length value based upon an assumption that the opcode is two bytes in length and based upon an assumption that the instruction modifier is present, the memory-length-two logic unit and the memory-length-one logic unit configured to operate in parallel; and a multiplexer to determine the second length value, wherein the determination comprises selecting between the first anticipatory length value and the second anticipatory length value.

16. The logic of claim 15 wherein the memory-length-one logic unit is further to determine a length of the instruction modifier; to determine an instruction displacement length in accordance with the instruction modifier; and to combine the length of the instruction modifier and the displacement length to generate the second length value.

17. The logic of claim 15 wherein the memory-length-one logic unit is further to determine a length of the instruction modifier; to determine an instruction displacement length in accordance with the instruction modifier; and to combine the length of the instruction modifier and the displacement length to generate the second length value.

18. A system for decoding the length of a macro instruction comprising:

means for generating a first length value comprising a length of an opcode plus a length of intermediate data;

means for generating a second length value comprising a potential length of a memory displacement, the generating of the second length value occurring in parallel with the generating of the first length value; and means for summing the first length value and the second length value if the second length value is present.

19. The system of claim 18 further comprising:

means for determining if an instruction modifier is present, wherein the means for determining is operated in parallel with the means for generating the first length value and the means for generating the second length value.

20. The system of claim 18, further comprising:

means for generating a first anticipatory length value for the memory displacement based upon an assumption that the opcode is one byte in length; and means for generating a second anticipatory length value for the memory displacement based upon an assumption that the opcode is greater than one byte in length, wherein the first anticipatory value, the second anticipatory value, and the first length value are generated at the same time.

21. A system for decoding the length of a macro instruction comprising:
    means for generating a first length value, the first length value comprising a length of an opcode plus a length of intermediate data;
    means for generating a second length value, the second length value comprising a potential length of a memory displacement, the generating of a second length value being performed in parallel with the generating of a first length value;
    means for generating in parallel potential lengths of memory displacement based upon the opcode being operable to be one byte in length as well as greater than one byte in length; and
    means for summing the first length value and the second length value if the second length value is present.

22. An instruction length decoder for decoding the length of a macro instruction comprising:
    an opcode-plus-immediate logic unit to generate a first length value comprising a length of an opcode plus a length of intermediate data;
    a memory-length logic unit to generate a second length value comprising a potential length of a memory displacement for both a one byte opcode as well as a two byte opcode, the memory-length logic unit and the opcode-plus-immediate logic unit to operate in parallel, the memory logic unit to generate the length of memory displacement for the one byte opcode and the two byte opcode at the same time; and
    a length-summation logic unit to sum the first length value and the second length value if the second length value is present.

23. The decoder of claim 22 further comprising:
    a modification-bit-present logic unit to determine if an instruction modifier is present, wherein the modification-bit-present logic unit operates in parallel with the opcode-plus-immediate logic unit and the memory-length logic unit.

* * * * *

UNITED STATES PATENT AND TRADEMARK OFFICE
CERTIFICATE OF CORRECTION

PATENT NO. : 6,684,322 B1
DATED : January 27, 2004
INVENTOR(S) : Gruner et al.

It is certified that error appears in the above-identified patent and that said Letters Patent is hereby corrected as shown below:

Column 3,
Line 22, delete "(" before the word "Processors",

Signed and Sealed this

Ninth Day of November, 2004

JON W. DUDAS
*Director of the United States Patent and Trademark Office*